(12) United States Patent
Uchida

(10) Patent No.: US 6,370,258 B1
(45) Date of Patent: Apr. 9, 2002

(54) IMAGE PROCESSING APPARATUS AND METHOD

(75) Inventor: Yoshiki Uchida, Newport Beach, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/086,501

(22) Filed: May 29, 1998

(30) Foreign Application Priority Data

Jun. 11, 1997 (JP) .............................................. 9-153665

(51) Int. Cl.⁷ ................................................ G06K 9/00
(52) U.S. Cl. ...................................................... 382/100
(58) Field of Search ................................ 382/100, 232, 382/284; 380/54; 713/168, 176, 160, 161, 169, 170; 705/67; 455/411

(56) References Cited

U.S. PATENT DOCUMENTS

| | | | |
|---|---|---|---|
| 5,257,119 A | | 10/1993 | Funada et al. ............... 358/438 |
| 5,337,362 A | * | 8/1994 | Gormish et al. .............. 380/54 |
| 5,457,540 A | | 10/1995 | Kajita ......................... 358/450 |
| 5,541,993 A | * | 7/1996 | Fan et al. .................... 380/243 |
| 5,708,717 A | * | 1/1998 | Alasia ......................... 380/51 |
| 5,859,920 A | * | 1/1999 | Daly et al. .................. 382/115 |
| 5,917,615 A | * | 6/1999 | Reifman et al. ............. 358/468 |
| 5,930,369 A | * | 7/1999 | Cox et al. .................... 380/54 |
| 5,974,548 A | * | 10/1999 | Adams ........................ 713/200 |

OTHER PUBLICATIONS

"Data embedding into pictorial images with less distortion using discrete cosine transform" By Ogihara et al., Proceedings of international conference on pattern recognition, IEEE, Aug. 25–29, 1996.*

* cited by examiner

Primary Examiner—Andrew W. Johns
Assistant Examiner—Shervin Nakhjavan
(74) Attorney, Agent, or Firm—Fitzpatrick, Cella, Harper & Scinto

(57) ABSTRACT

An image processing apparatus for adding additional information to an input image so that it cannot be easily identified by the human eye, and a method of operating such an apparatus, are provided. Various functions are described for adding predetermined additional information to the input image in such a way that it cannot be easily identified by the human eye. The apparatus includes a first input device for inputting first additional information by a first data input method; a second input device for inputting second additional information by a second data input method different from the first input method; a selection device for selecting one of the first and the second input device; an addition device for adding the first or second additional information, input from the first or second input device, to the input image data so that it cannot be easily identified by the human eye; and an output device for outputting the image data to which the additional information is added by the addition device.

20 Claims, 9 Drawing Sheets

FIG. 3

AN IMAGE WILL NOW BE INPUT.
WHEN WATERMARK INFORMATION IS TO BE ADDED, PRESS THIS BUTTON.

WATERMARK INFORMATION INPUT — 100-1

WHEN WATERMARK INFORMATION IS NOT REQUIRED, AFTER THE DOCUMENT IS SET ON THE DOCUMENT HOLDER, PRESS THE START BUTTON.

START — 100-2

2000

INSERT THE ID CARD.

2000

IMAGE PROCESSING APPARATUS AND METHOD

BACKGROUND OF THE INVENTION

1. Field of the Invention

The present invention relates to an image processing apparatus and a method for adding predetermined additional information to an input image in such a way that it cannot be easily identified by the human eye.

2. Description of the Related Art

In recent years, there has been developed a commonly called digital-watermark technology which adds predetermined additional information to electronic image data. Such digital-watermark technology is able to prevent the above-described image data from being used by unauthorized persons by embedding information provided by the author (for example, regarding a copyright) as additional information in the image data. However, although there is technology for adding predetermined additional information to an input image in such a way that it cannot be easily identified by the human eye, there have hardly been any specific apparatuses or technology for performing such addition. Therefore, improvements in the ease of use of such an apparatus have not yet been taken into consideration.

SUMMARY OF THE INVENTION

An object of the present invention, which has been achieved in view of the above-described related art, is to provide a specific apparatus capable of adding predetermined additional information to an input image in such a way that it cannot be easily identified by the human eye, and a method of operating such an apparatus.

Specifically, it is an object of the present invention is to provide various functions required to add predetermined additional information to an input image in such a way that it cannot be easily identified by the human eye.

To achieve the above-described object, according to the present invention, there is provided an image processing apparatus, comprising: first input means for inputting first additional information by a first data input method; second input means for inputting second additional information by a second data input method different from the first data input method; selection means for selecting one of the first input means and the second input means; addition means, connected to the first input means, the second means and the selection means, for adding the first additional information or second additional information input from the selected one of the first input means and the second input means to input image data so that the additional information cannot be easily identified by a human eye; and output means, connected to the addition means, for outputting the image data to which the additional information is added by the addition means.

The above object, as well as further objects, aspects and novel features of the invention, will become more apparent from the following detailed description when read in connection with the accompanying drawings.

BRIEF DESCRIPTION OF THE DRAWINGS

FIG. 3 is a view showing an example of a selection screen for input of watermark information.

DETAILED DESCRIPTION OF THE PREFERRED EMBODIMENT

The preferred embodiment of the present invention will be described below with reference to the accompanying drawings.

Figure 1:
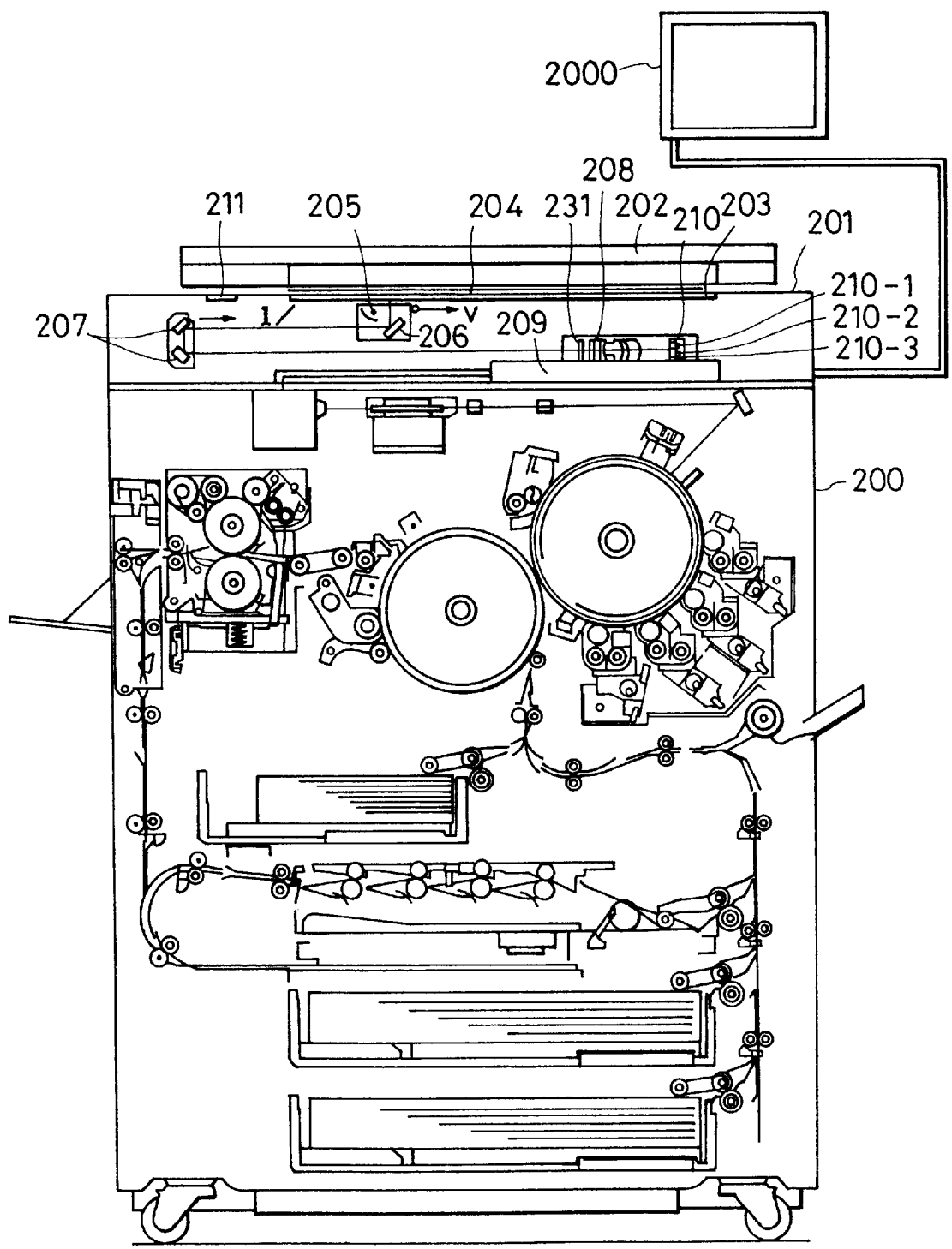
FIG. 1 is a sectional view of the construction of an image processing apparatus according to the present invention.

FIG. 1 is a sectional view showing the construction of an image processing apparatus according to this embodiment. Referring to FIG. 1, reference numeral 201 denotes an image scanner section. The image scanner section 201 generates image data corresponding to an original document after the original document is read, and performs required image processing on this image data. Reference numeral 200 denotes a printer section, which prints in full color an image represented by the image data (which is generated and subjected to image processing in the image scanner section 201) on a recording medium, such as printing paper.

Furthermore, reference numeral 2000 denotes a touch-panel display device, on which is displayed a selection screen for color copying, monochrome copying, single-color copying, or the like, or a selection screen for density or the like, and which preferably is a display device such that the above selections can be performed by touching the screen.

In the image scanner section 201, an original document 204 placed on a document-holder glass (platen) 203 and pressed down by a document press plate 202 is radiated by light from a halogen lamp 205. The light reflected from this original document 204 is guided to mirrors 206 and 207, and focused by a lens 208 into an image on a CCD 210 having three line sensors 210-1, 210-2 and 210-3. The lens 208 is provided with an infrared cut filter 231.

The CCD 210 color-separates the information of the light reflected from the original document 204 and generates full-color components of red (R), green (G), and blue (B), and then sends them to the signal processing section 209.

Each of the sensor sequences corresponding to each color component in the CCD 210 is made up of 5,000 pixels. As a result, 297 mm along the length direction of an A3-size document, which is the largest size document which may be positioned on the document-holder glass 203, can be read at a resolution of 400 dpi.

The halogen lamps 205 and 206 move mechanically at a speed v, and the mirror 207 moves at a speed (½)v in a direction (hereinafter referred to as a subscanning direction) perpendicular to the electrical scanning direction (hereinafter referred to as a main scanning direction) of the line sensor 210, thus scanning the front side of the original document 204.

A standard white plate 211 is used to generate adjustment data for the image data generated by the R, G, and B sensors 210-1 to 210-3. This standard white plate 211 shows almost uniform reflection characteristics in visible light and presents a white color to the naked eye. By reading standard white plate 211 by the R, G, and B sensors 210-1 to 210-3, adjustment data at levels of white color is generated; in accordance with this data, the signal processing section 209 performs adjustment of the image data generated from the R, G, and B sensors 210-1 to 210-3.

Next, the signal processing section 209 will be described.

Figure 2:
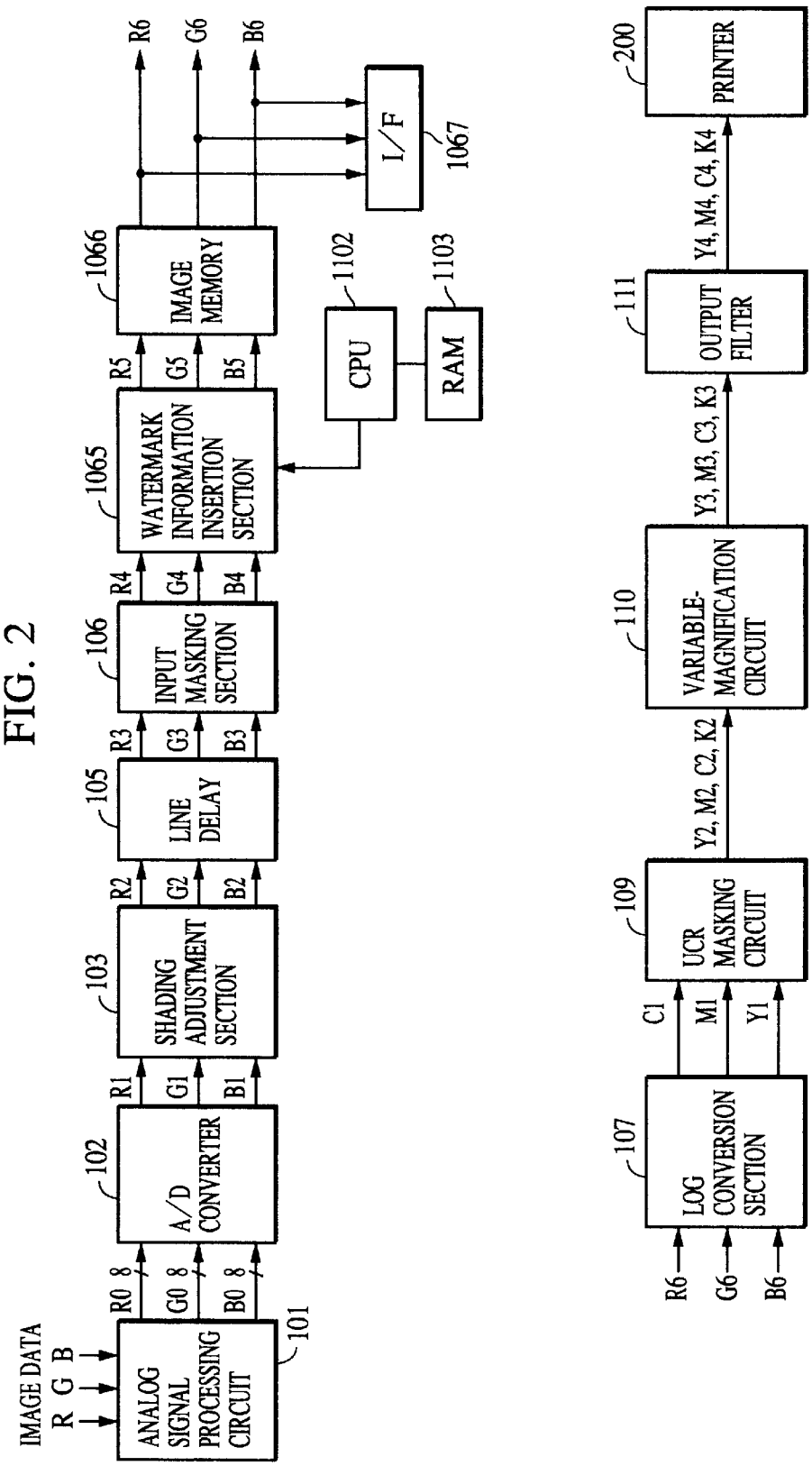
FIG. 2 is a view showing details of construction of a signal processing section according to an embodiment of the present invention.

FIG. 2 is a block diagram showing how image data is processed by the signal processing section 209 of the image scanner section 201. As shown in FIG. 2, image data of the R, G, and B components output from the CCD 210 is input to an analog signal processing circuit 101, whereby gain adjustment and offset adjustment are performed on this data, and then converted into digital image data R1, G1, and B1 of eight bits for each color data by an A/D converter 102. Then, the image data R1, G1, and B1 is input to a shading adjustment section 103 whereby well-known shading adjustment is performed on the image data in accordance with the adjustment data obtained by reading the standard white plate 211 for each color.

The line delay circuit 105 is a line delay circuit having a line memory, and is capable of delaying data by an amount corresponding to any line in accordance with a line synchronization signal.

Since the light-receiving sections 210-1, 210-2 and 210-3 of the CCD 210 are disposed spaced apart by a predetermined distance, in the line delay circuit 105, spatial deviation of the signals R2, G2, and B2 along the subscanning direction is corrected.

An input masking section 106 is a section for converting a reading color space determined by the spectral characteristics of R, G, and B filters of the CCD 210 into a standard color space, such as a NTSC (National Television System Committee) color television system, and performs matrix computation as in the following equation:

$$\begin{pmatrix} R4 \\ G4 \\ B4 \end{pmatrix} = \begin{pmatrix} a11 & a12 & a13 \\ a21 & a22 & a23 \\ a31 & a32 & a33 \end{pmatrix} \begin{pmatrix} R3 \\ G3 \\ B3 \end{pmatrix}$$

Watermark information (additional information) is added to the image data R4, G4, and B4 which have been adjusted by a watermark information insertion section 1065. Watermark information is input to the watermark information insertion section 1065 by a well-known method through a CPU 1102. A RAM 1103 is attached to the CPU 1102, and watermark information input using a plurality of methods to be described later can be stored in RAM 1103.

Image data R5, G5, and B5 to which the watermark information has been added are held in an image memory 1066. This memory is capable of communicating image data with various types of media connected through an interface section 1067, and also outputting and printing image data to an external printer and providing this image data to an external computer which performs image editing and the like through the interface section 1067.

Next, a description will be given of a case in which the image data is provided to the printer section 200.

The image memory 1066 is also connected to a LOG (logarithm) conversion section 107 in addition to the interface section 1067. The image data R5, G5, and B5 stored in the image memory 1066 is output as image data R6, G6, and B6, respectively, to the interface section 1067 and the LOG conversion section 107.

The image data R6, G6, and B6 input to the LOG conversion section 107 is converted into C (cyan), M (magenta), and Y (yellow) components. The image data are then converted into four components of C, M, Y, and K (black) by masking and UCR (under color removal) processing performed by a masking and UCR circuit 109. The components are then provided by a variable-magnification circuit 110 to the printer section 200 through an output filter circuit 111.

Next, the operation for adding watermark information by the watermark information insertion section 1065 will be described in detail with reference to FIG. 3 and subsequent figures.

Initially, when a user gives various instructions from the touch-panel display device 2000 to the image processing apparatus at the time an original document is read from the image scanner section 201, an image such as that shown in FIG. 3 is displayed on the display device.

FIG. 3 shows a selection screen from which a selection can be made as to whether watermark information (additional information) is to be embedded with respect to the image data obtained by reading the original document from the image scanner section 201. By touching (selecting) at the position of a button 100-1, an operation for adding watermark information can be performed.

When, on the other hand, watermark information is not required to be embedded, a start button 100-2 is selected without any other action so as to read the document; the document then is printed by the printer section 200 without embedding the watermark information.

When the user wants to add watermark information, the user selects the button 100-1. Thereupon, the screen is switched to a screen such as that shown in FIG. 4.

Figure 4:
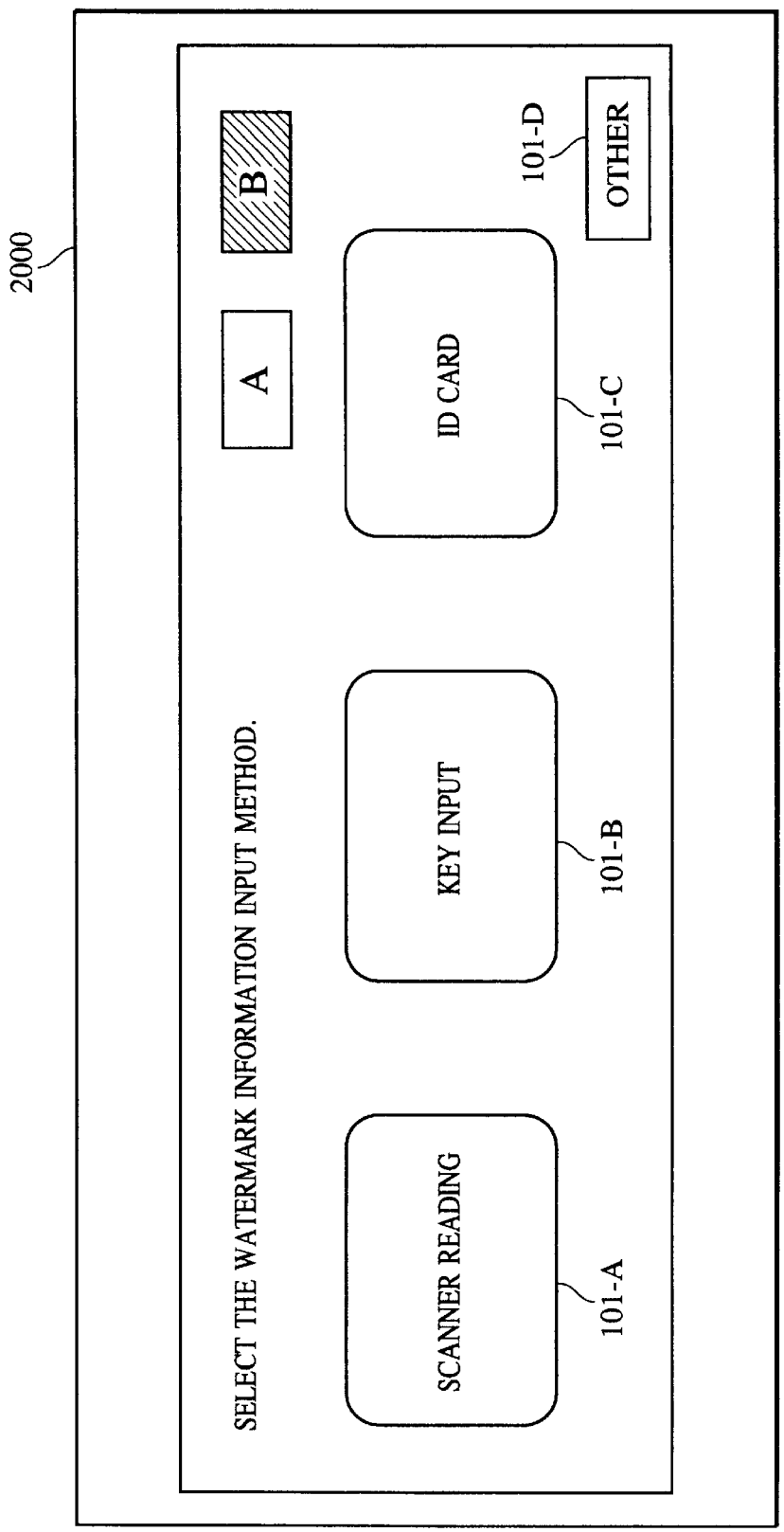
FIG. 4 is a view showing another example of a selection screen for input of watermark information.

FIG. 4 shows a screen for specifying a method of inputting watermark information. In this embodiment, there are three main methods: a method (selected by touching a button 101-A) of inputting image data obtained by reading an image from the scanner as the watermark information, a method (selected by touching a button 101-B) of inputting a sequence of characters, numerals, or the like, as watermark information using key input, and a method (selected by touching a button 101-C) of inputting a sequence of characters, numerals, or the like as watermark information, obtained by reading an ID card which the user possesses by a magnetic code reader in advance.

The image processing apparatus of the present invention has other functions which make it possible to use other input methods in addition to the above-described watermark information input methods. For example, the following methods can be employed in addition to the three methods described earlier: a method in which characters or numerals handwritten on the touch panel are recognized and used as watermark information; a method in which a bar code that the user possesses is read in advance by the image scanner section 201 of the image processing apparatus, and the information represented by this bar code is used as the watermark information; and a method in which a sequence of characters, numerals, or the like, obtained by reading characters and numerals which are actually written in the document and processed by OCR (optical character recognition) techniques using the scanner 201, are used as watermark information. These other methods may be selected by touching a button 101-D labeled "Other".

The watermark information input by this plurality of methods is stored in the RAM 1103 shown in FIG. 2 and read when the watermark information is added by the watermark information insertion section 1065.

Figure 5:
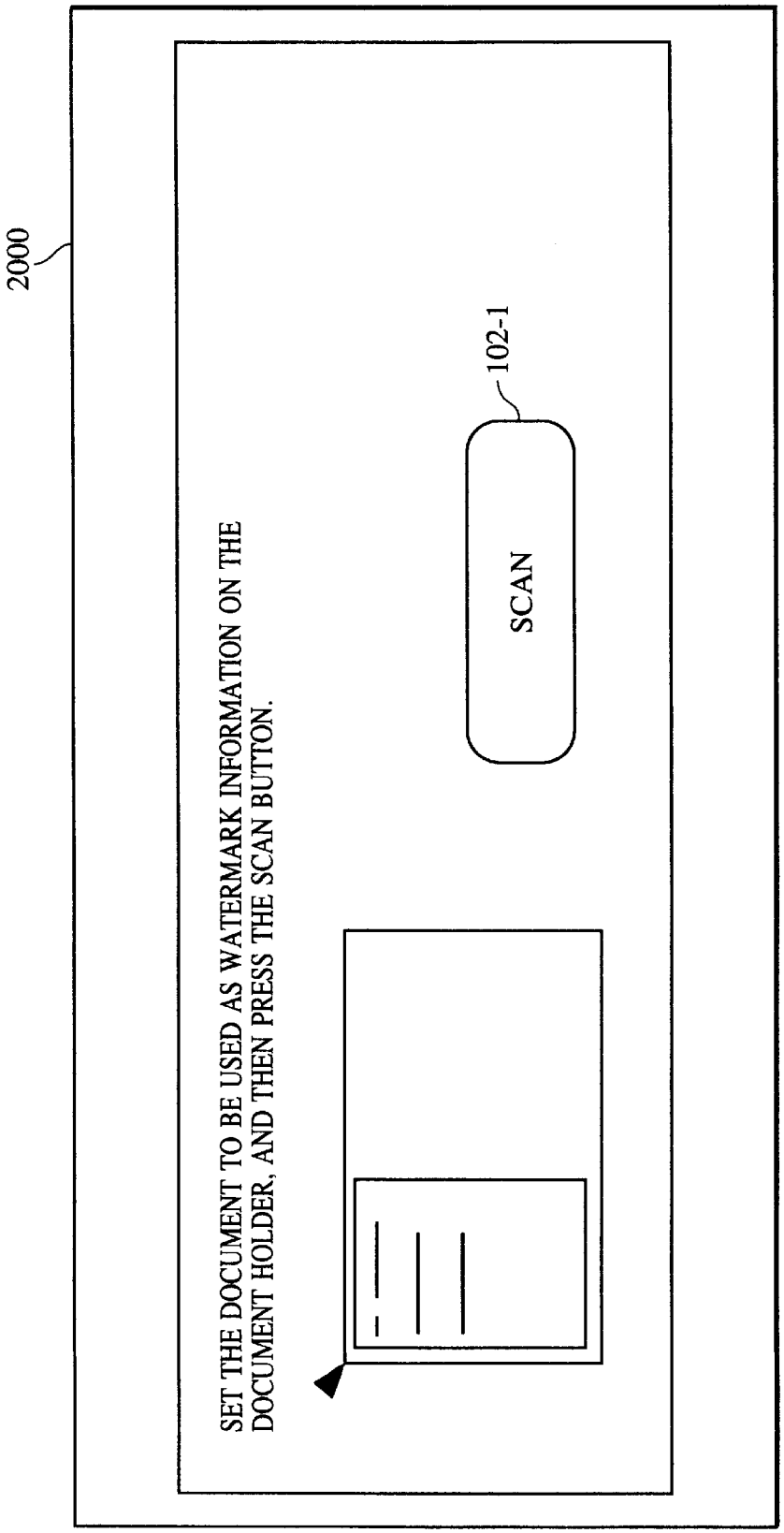
FIG. 5 is a view showing still another example of a selection screen for input of watermark information.

When the user selects the button 101-A, the screen is switched to a selection screen such as that shown in FIG. 5 and displayed. FIG. 5 show a display for prompting the user to place the document having an image which is watermark information on the document holder. As a result of selecting a scan button 102-1 after this document is placed on the document holder, the scanner 201 scans the document, generates watermark information in accordance with the image on the document, and inputs it.

In the present invention, the image which has already been printed in the document placed on the document holder may or may not be a normal pattern image which can be easily identified by the human eye. For example, in the former case, only the pattern image may be printed in the document, and the image data input from the scanner 201 becomes an image which shows the watermark information as it is. In the latter case, a sample image has been printed in the document, and watermark information has been added in such a way that it cannot be easily identified by the human eye. By analyzing the image input from the scanner 201 once, only the watermark information is extracted. In the latter case, the contents of the watermark information input by the above-described operation cannot be known by persons other than the user, and therefore, security of the image data can be maintained.

Figure 6:
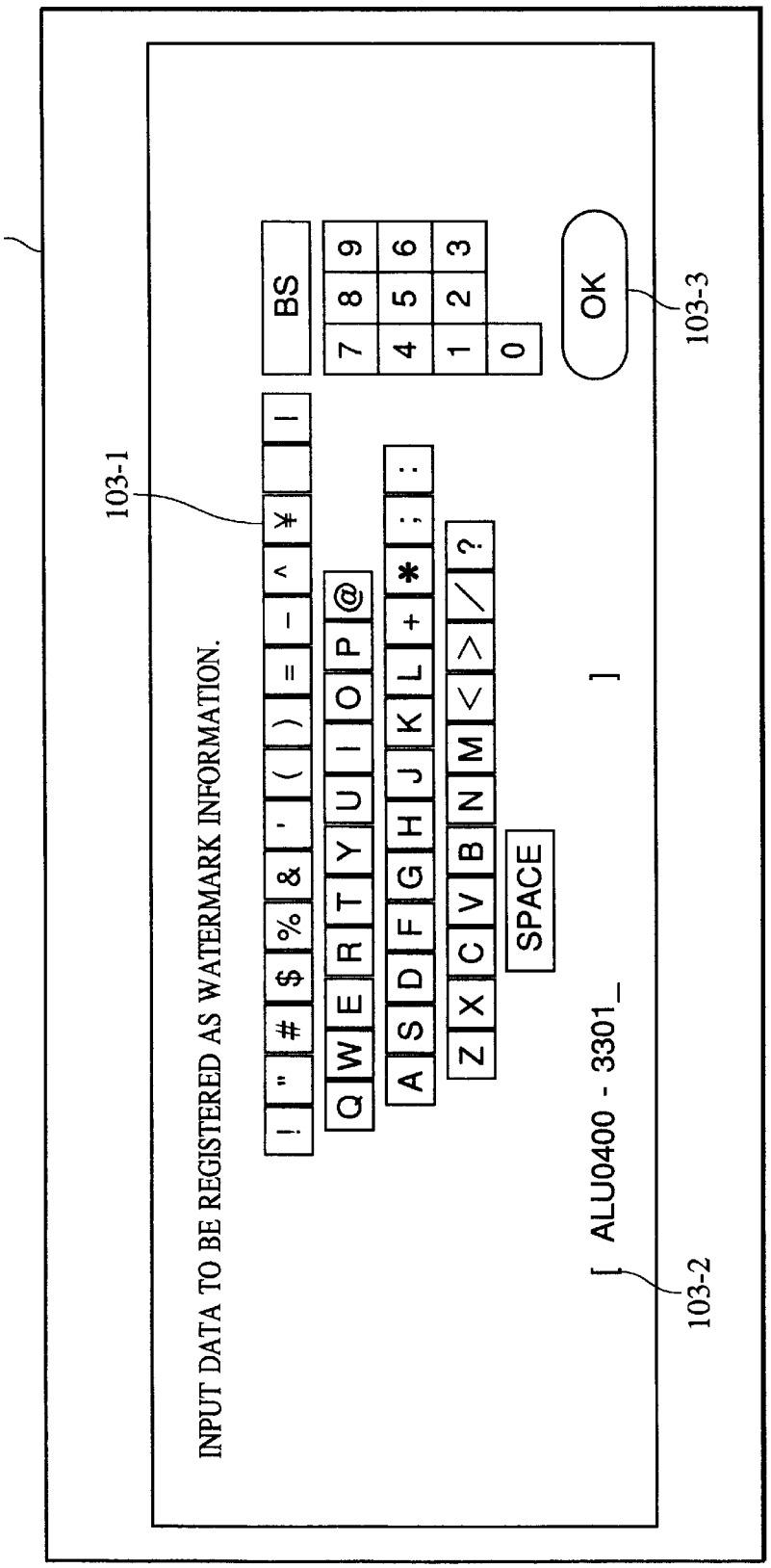
FIG. 6 is a view showing an example of an input screen for watermark information.

When the user selects the button 101-B, a selection screen such as that shown in FIG. 6 is displayed. In FIG. 6, reference numeral 103-1 denotes a pseudo-keyboard display section from which characters and numerals can be selected in the same manner as in a keyboard by touching the position corresponding to each key.

In addition, in the present invention it is also possible to input characters and numerals from a keyboard which is actually connected externally.

Reference numeral 103-2 denotes a section for displaying character and numeral sequences input from the pseudo-keyboard display section or from a keyboard which is connected externally; from this section the sequence of characters and numerals input as watermark information can be confirmed.

After the input using this keyboard is completed, the selection of an OK button 103-3 causes the character and numeral sequences shown in the display section 103-2 to be stored in the RAM 1103 as watermark information.

Figure 7:
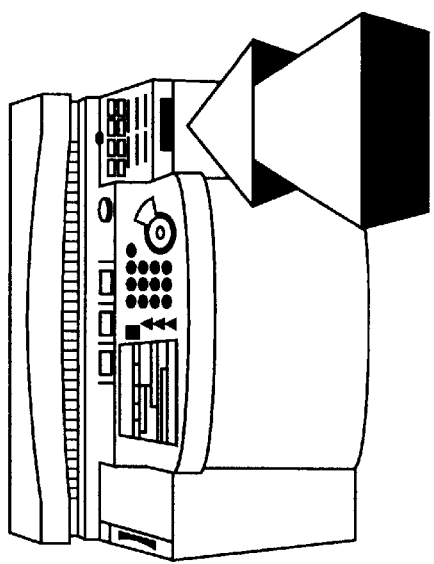
FIG. 7 is a view showing an example of a display screen for prompting an input of watermark information.

When, on the other hand, the user selects the ID card button 101-C, a screen such as that shown in FIG. 7 is displayed. The display of FIG. 7 prompts the user to insert his ID card into the magnetic reader.

When the user inserts the ID card in accordance with this display, the apparatus detects the insertion automatically and reads the magnetic information stored in the ID card. At the same time, the screen is switched from the screen of FIG. 7 to the screen of FIG. 8.

In this embodiment information is stored magnetically on the ID card. However, in addition to this, a card readable by OCR, a CD-ROM (compact disc-read-only memory) for storing information optically, or the like may be used instead. In such a case, in addition to a magnetic reading section, an apparatus which reads information optically is provided in the main unit of the image processing apparatus. Furthermore, other information storage media such as a floppy disk or the like can be used.

Figure 8:
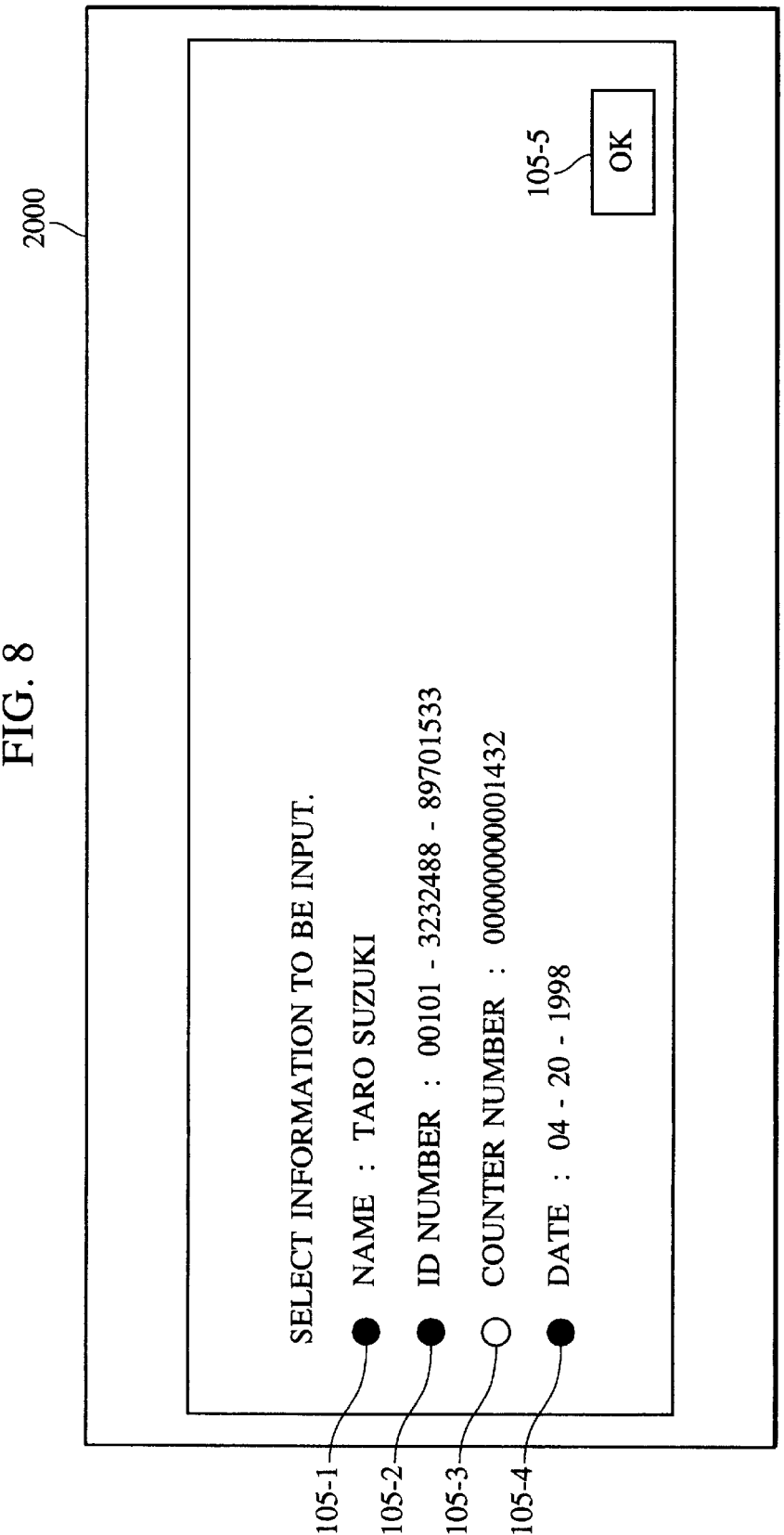
FIG. 8 is a view showing an example of a screen for selecting watermark information.

FIG. 8 shows a screen for displaying a plurality of types of information stored on the ID card and for selecting the information to be input as watermark information from this information.

The user selects one or more of the select buttons 105-1, 105-2, 105-3 and 105-4 on the display screen of FIG. 8 so that each button is determined to be a reversed display (selected state) or a non-reversed display (non-selected state). Then, in a state in which at least one of the buttons 105-1 to 105-4 is selected, the OK button 105-5 is selected. This causes the selected information to be stored as watermark information in the RAM 1103.

After watermark information has been input by selectively using various input methods in the procedure described above, a document (to which watermark information is to be added) having image data (where the image is desired to be copied or is desired to be output to an external computer) is placed on the document holder. Then, the selection of the display on the display device or the start button provided within the image processing apparatus causes the scanner 201 to read the document.

The above-described various watermark information is added by the watermark information insertion section 1065 to the image data corresponding to the document; the image data is then stored in the image memory 1066. The image data stored in the image memory 1066 is output to the printer section 200 and also to the various external apparatuses connected to the interface section 1067 in the above-described manner.

Examples of these external apparatuses include: an Internet terminal having an Internet address specified by operating, for example, the touch-panel display 2000; an external hard disk which is used as an external storage section for this image processing apparatus; and a facsimile apparatus with a destination to be facsimile-transmitted via a modem and a telephone line.

The technology for embedding watermark information will now be briefly described. In the present invention, the following well-known technologies can be used selectively.

For example, a method has been described of varying the dot position of an image in such a manner as to represent additional information in one component (the Y component of the four color components Y, M, C, and K) which cannot be easily identified by the human eye in color image data made up of a plurality of color components (U.S. Pat. No. 5,457,540).

Further, there is a method of modulating the density of the image in such a manner as to represent additional information in one component (the Y component of the four color components Y, M, C, and K) which cannot be easily identified by the human eye in color image data made up of a plurality of color components.

Figure 9:
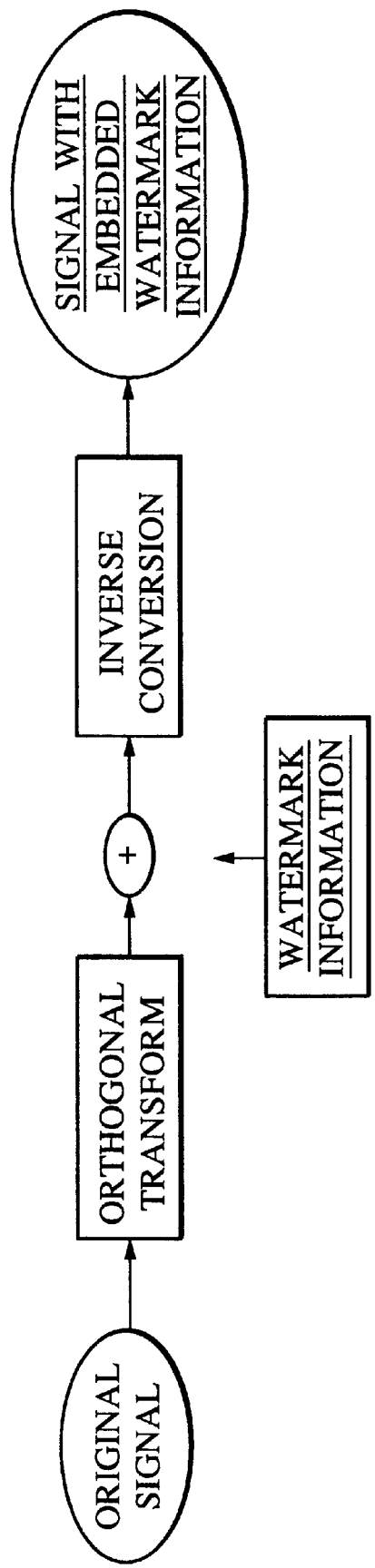
FIG. 9 is a schematic diagram showing an example of watermark information input technology.

Further, there is a method in which image data is converted into frequency components, and watermark information is embedded into only a specific component of the plurality of generated frequency components, as shown in FIG. 9. In this method, in order to minimize the deterioration of image quality, watermark information is embedded in the frequency components (mainly the high-frequency components) which cannot be easily identified by the human eye. Such a technology, which embeds watermark information into specific frequency components, can be used advantageously in the present invention.

In the present invention, by using these watermark information addition technologies, watermark information input by selectively using any one of the above-described plurality of watermark information input means is added to the input image data in such a way that it cannot be easily identified by the human eye.

According to the above embodiment, in an image processing apparatus which performs various image processing operations on the input image data and then outputs the data to an external apparatus or a storage medium, it is possible for a user to make a selection of whether or not watermark information is to be added or to select a method of inputting watermark information. Therefore, it is possible for the user to easily have various watermark information (additional information) embedded into the original image.

Further, in the present invention, in the case where a document is read to generate watermark information, even if an image used as watermark information has been added to a sample image of the document in such a way that it cannot be easily identified by the human eye, this image processing apparatus is able to extract only the watermark information by analyzing the sample image input from the scanner 201 once. Therefore, the contents of the watermark information are known only to the user, and the security of the watermark information can be maintained.

In the image processing apparatus of the above-described embodiment, a description has been given of the case in which the watermark information is added in such a way that it cannot be easily identified by the human eye. However, there may be a demand for synthesizing watermark information in such a way that it can be easily identified by the human eye, as in normal image synthesis. In that case, the above-described embodiment may be modified to include a selection such as that described below, which may be performed using the touch-panel display device 2000.

Specifically, there are two buttons "A" and "B" on the screen of FIG. 4. The button "A" is a button for specifying that watermark information is synthesized with the original input image in such a way that it can be easily identified by the human eye. The button "B" is a button for specifying that watermark information is added to the original input image in such a way that it cannot be easily identified by the human eye by using the above-described well-known art.

In the above-described embodiment, only one of the input methods of the buttons 101-A to 101-D can be specified on the screen of FIG. 4, and the button "B" is forcibly selected.

However, in this modification, one of the buttons "A" and "B" can be selected before the buttons 101-A to 101-D are selected. When any one of the buttons 101-A to 101-D is selected after the button "A" is selected, watermark information input after this selection is simply synthesized with the input image. Therefore, by viewing the image obtained after being synthesized, the presence of the watermark information can be discerned easily. This is effective for a case where the original image is not desired to be widely circulated. When, on the other hand, one of the buttons 101-A to 101-D is selected after the button "B" is selected, results exactly similar to those of the above-described embodiment are obtained. This is effective for cases where an image comparable to the original image is desired to be widely circulated. Therefore, the specification of the buttons "A" and "B" is selected according to the intended use of the image.

In addition to each construction of the image processing apparatus as described above, a processing method including steps of operation of each apparatus is included within the scope of the present invention. Furthermore, a storage medium in which programs for performing such steps of operation are stored in such a manner as to be readable from a computer is also included within the scope of the present invention.

According to the present invention, inputting of watermark information (additional information) that the user wants to add can be performed easily by an operation from a touch-panel display in a copier or the like. Accordingly, the present invention may be advantageously applied to an image processing apparatus, such as a copier. Furthermore, since the present invention includes a plurality of types of means of inputting this watermark information, it is possible to increase the number of types of watermark information that the user can add and thus greatly expand the range of applications in which watermark information is added.

Since watermark information (additional information) is embedded in the input image data in such a way that it cannot be easily identified by the human eye, even if this input image data is made visible (that is, displayed or printed), this data can be used in the same manner as the original image. It is possible to obtain information (the author, the user ID of the image processing apparatus, the name of the image, etc.) regarding the image by analyzing the image which is made visible, and thereby detect unauthorized use of the image.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing apparatus, comprising:
    display means for displaying plural sources of first and second additional information to be embedded into input image data;
    first input means for selecting and inputting first additional information of one of the plural sources of first additional information by a first data input method;
    second input means for selecting and inputting second additional information from one of the plural sources of second additional information by a second data input method different from said first data input method;
    selection means for selecting one of said first input means or said second input means;
    embedding means connected to said first input means, said second input means and said selection means, for embedding the first additional information or second additional information selected by the selection means into input image data so that said additional information cannot be easily identified by a human eye in a visible image formed in accordance with said input image data; and
    output means connected to said embedding means, for outputting the image data to which said additional information is embedded by said embedding means,
        wherein said input image data is converted into a plurality of generated frequency components, and wherein said first additional information or second additional information is embedded into only a specific component of the plurality of generated frequency components, the specific component comprising high-frequency components.

2. An image processing apparatus according to claim 1, wherein one of the plural sources of first additional information comprises a scanner for reading a predetermined document.

3. An image processing apparatus according to claim 2, wherein said input image data is input by reading a document different from said predetermined document by said scanner.

4. An image processing apparatus according to claim 2, wherein said first input means inputs an image which shows said document as the first additional information.

5. An image processing apparatus according to claim 2, wherein said first input means extracts information embedded to said document so that said extracted information cannot be easily identified by the human eye and inputs the extracted information as the first additional information.

6. An image processing apparatus according to claim 1, wherein one of the plural sources of second additional information comprises a magnetic reader capable of reading information from a magnetic storage medium.

7. An image processing apparatus according to claim 1, wherein one of the plural sources of second additional information comprises an optical reader capable of reading information from an optical storage medium.

8. An image processing apparatus according to claim 1, wherein one of the plural sources of first additional information comprises a touch-panel display.

9. An image processing apparatus according to claim 1, wherein said second input means comprises an external keyboard connected to said image processing apparatus.

10. An image processing apparatus according to claim 1, wherein said selection means comprises a touch-panel display.

11. An image processing apparatus according to claim 1, wherein said display means comprises a touch-panel display.

12. An image processing apparatus according to claim 1, wherein said embedding means is capable of embedding said first additional information or second additional information to said input image data in such a way that said additional information can be easily identified by the human eye, and said display means for making a display whereby a user selects whether said first additional information or second additional information should be embedded to said input image data so that said additional information can be easily identified by the human eye or so that said additional information cannot be easily identified by the human eye.

13. An image processing apparatus according to claim 12, wherein said display means comprises a touch-panel display.

14. An image processing apparatus according to claim 1, further comprising image formation means for forming image data output from said output means as a visible image.

15. An image processing apparatus according to claim 1, wherein said output means outputs image data to which said additional information is embedded by said embedding means to an external apparatus.

16. An image processing apparatus according to claim 15, wherein said external apparatus comprises an Internet terminal connected over the Internet to said image processing apparatus.

17. An image processing apparatus according to claim 15, wherein said external apparatus comprises an external hard disk connected to said image processing apparatus.

18. An image processing apparatus according to claim 15, wherein said external apparatus comprises a facsimile apparatus connected to said image processing apparatus over a telephone line.

19. An image processing apparatus according to claim 15, wherein said external apparatus comprises an external computer connected to said image processing apparatus and which is capable of performing image editing.

20. An image processing method, comprising:

a display step of displaying plural sources of first and second additional information to be embedded into input image data;

a first input step of selecting and inputting by first input means first additional information of one of the plural sources of first additional information using a first data input method;

a second input step of selecting and inputting by second input means second additional information from one of the plural sources of second additional information using a second data input method different from said first data input method;

a selection step of selecting one of said first input step or said second input step to be performed;

an embedding step of embedding the first additional information or second additional information, in accordance with a selection made in said selection step, into input image data so that said additional information cannot be easily identified by the human eye in a visible image formed in accordance with input image data; and an output step of outputting image data to which said additional information is embedded in said embedding step, wherein said input image data is converted into a plurality of generated frequency components, and wherein said first additional information or second additional information is embedded into only a specific component of the plurality of generated frequency components, the specific component comprising high-frequency components.

\* \* \* \* \*